March 11, 1958     E. F. SPENCER, JR     2,826,383

WIRE MESH CONVEYOR BELT

Filed Nov. 15, 1956

Inventor
Earle F. Spencer, Jr.
by Robert S. Toperzer, Atty.

United States Patent Office 2,826,383
Patented Mar. 11, 1958

2,826,383

WIRE MESH CONVEYOR BELT

Earle F. Spencer, Jr., Winchester, Mass., assignor to Wire Belt Company of America, Winchester, Mass., a corporation of Delaware Application November 15, 1956, Serial No. 622,444

4 Claims. (Cl. 245—10)

This invention relates to conveyor belts, particularly wire mesh conveyor belts adapted for travel in an endless path.

Because of their inherent heat and moisture resistant qualities, reticulate wire belts have found wide use in conveyor applications and especially in conveyors for food products such as chocolate candies or cookies where a coating of liquid or comminuted material is to be applied to the product. One common type of reticulate wire belt has individual strands which are formed in a generally zigzag configuration, as shown for example in the patent to T. and D. Kihlgren issued November 21, 1911. Although this zigzag type belting has been used successively for many years and found to have the desirable attributes of high flexibility and low cost, a recurrent problem arises when it is sought to join the ends of the belt together in order to make it continuous or endless. Ordinarily, what is done is a splicing strand is laced through first one and then the other of the respective end strands of the belt, repetitively, until the splicing strand has been interlocked with the end strands all along their respective lengths. Since the splicing strand usually has the same zigzag configuration as the end strands, and for that matter all the other strands which go to make up the belt, the time, skill and labor involved in carrying out this lacing process is appreciable. Not only must the splicing strand be interlocked point-by-point along its length necessitating a relatively large number of individual lacing operations, but also a predetermined sequence of operations must generally be followed in order to avoid deforming the splicing strand, as much as possible. Even when the most expedient sequence of operations is followed and the utmost care is taken, it has been found to be virtually impossible to do the job without distorting the splicing strand to some appreciable extent which is especially undesirable because it tends to weaken the splicing strand at the joints.

It is an object of the invention therefore to provide in combination with a wire mesh conveyor belt a novel splicing strand with which the ends of the belt may be joined relatively easily.

The novel features of the invention, together with further objects and advantages thereof, will become apparent from the following detailed description of a preferred embodiment of the invention as illustrated in the accompanying drawing. In the drawing.

Figure 1:
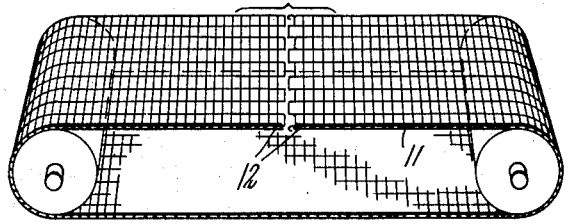
Fig. 1 is a perspective view of a wire mesh belt of the zigzag type on a reduced scale.
Figure 2:
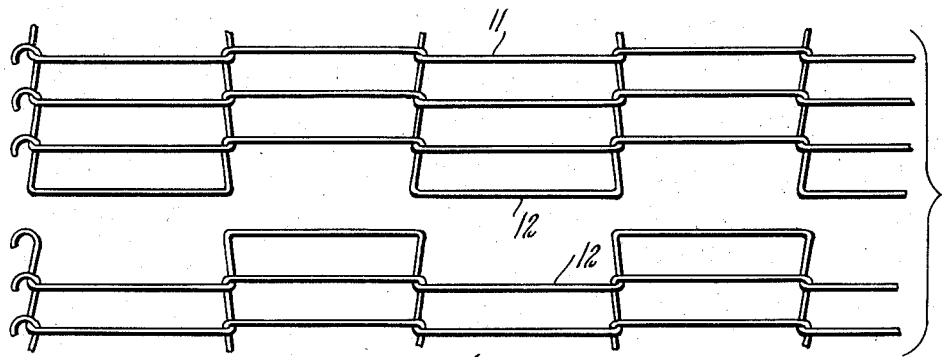
Fig. 2 is a view of the ends of the belt before they are interlocked.

With reference now to the drawing and more particularly to Fig. 1, it will be observed that a zigzag type reticulate conveyor belt has the general appearance of wire mesh, and in normal use is passed around a pair of nosings whose diameter and axial separation determine the lineal length of the belt. As shown in Fig. 2, the individual wires or strands which go to make up the belt extend across the line of travel and are formed in a generally zigzag configuration. That is to say, each strand such as strand 11, by way of example, has alternate straight portions and bent portions very nearly at right angles to the straight portions whereby adjacent strands are loosely interlocked. At the ends of the individual strands, hooks are formed and these serve to link the strands together all along the marginal edges of the belt. The end strands of the belt, that is the strands that are to be interlaced once the precise belt length has been established, are designated by numeral 12 in Fig. 2.

Figure 3:
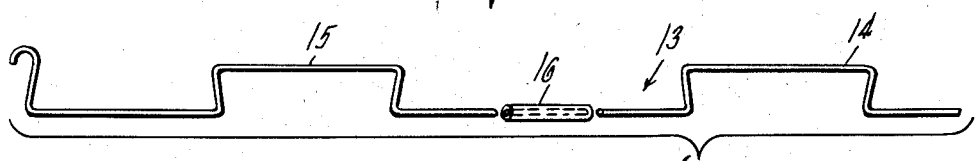
Fig. 3 illustrates the splicing strand employed to interlock the ends of the belt in accordance with the invention.

To join these respective end strands 12 together, there is provided in accordance with the present invention an articulate splicing strand 13 which is illustrated in Fig. 3. From Fig. 3 it will be observed that the splicing strand is formed with a plurality of individual wire segments 14 laid end-to-end, and when so oriented, having the same overall configuration as all the other strands in the belt such as strand 11 or the end strands 12. Specifically, each one of the individual segments 14 includes a central straight portion, and two bent portions at either end of the central straight portion, and terminates in two partial straight portions whose length is roughly half that of the central straight portion. The outermost individual segments 15 at the marginal edges of the belt also have hooked portions for engagement with the hooked portions of the end strands 12. To link the individual segments 14 (and 15) together, there are spacedly mounted on the splicing strand a number of coupling sleeves 16 which may conviently comprise relatively short lengths of thin-walled tubing. One coupling sleeve 16 is employed for each joint between the adjacent segments 14.

Figure 4:
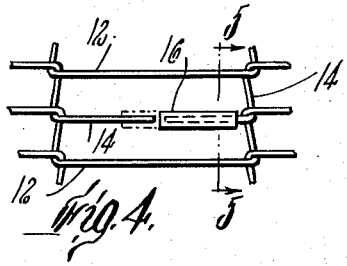
Fig. 4 illustrates the individual strands at the extreme ends of the belt and the arrangement of the splicing strand with respect thereto.
Figure 5:
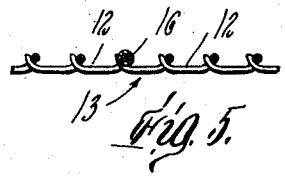
Fig. 5 is a sectional view taken on line 5—5 of Fig. 4.
Figure 6:
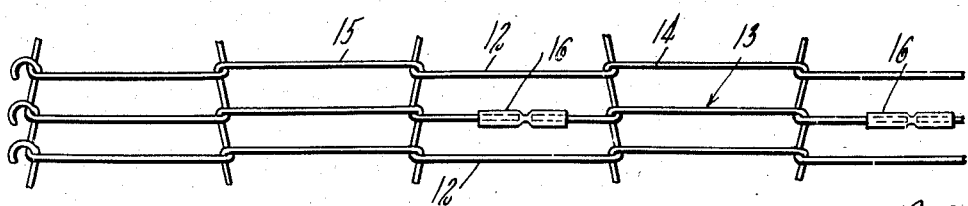
Fig. 6 is a view of the end strands in combination with the splicing strand after the ends of the belt have been joined thereby.

The saving in time and labor which is realized in joining the ends of the belt with the splicing strand 13 according to the invention will become apparent from Figs. 4 through 6. As shown in Fig. 4, by virtue of the fact that each segment of the splicing strand has only two bent portions, it is possible to interlock the segment with corresponding portions of the end strands without bending it at all. Thus, first one segment, then another, and so forth, is interlocked with the end strands in carrying out the lacing process without regard to any special sequence of operations. No problem of interference will arise because of the relatively free play of the segments. Once this interlocking process has been completed all along the width of the belt, it remains only to join the segments by means of the coupling elements 16. These can be readily slid over one end of each segment where the joints are to be formed, and then slid back over the adjacent segment ends so that they effectively bridge the points or regions where the segments meet. Preferably, each coupling sleeve is then crimped at its approximate center where a small gap exists between the ends of the segments. This effectively fixes the positions of the coupling sleeve laterally of the splicing strand, and thus prevents their sliding off one segment due to any vibration or shock as may be encountered under actual operating conditions. Of course, various other ways of holding the sleeves in place may optionally be employed.

Various such modifications as this that are within the spirit and scope of the invention will no doubt occur to those skilled in the art, and therefore the invention should not be deemed to be limited to the precise embodiment described in detail herein by way of example, but should be deemed to be limited only by the scope of the appended claims.

What is claimed is:

1. In a reticulate wire belt having individual strands formed with alternate straight portions extending across the line of travel of the belt and bent portions extending between the straight portions whereby adjacent strands are interlocked, an articulate splicing strand having substantially the same overall configuration as the interlocked strands, said splicing strand being formed with a plurality of wire segments disposed end to end and individually interlocked with the respective end strands of the belt, and coupling elements linking the adjacent ends of said wire segments.

2. In a reticulate wire belt having individual strands formed with alternate straight portions extending across the line of travel of the belt and bent portions extending between the straight portions whereby adjacent strands are interlocked, an articulate splicing strand having substantially the same overall configuration as the interlocked strands, said splicing strand being formed with a plurality of wire segments disposed end to end and individually interlocked with the respective end strands of the belt, and coupling sleeves in the form of relatively short lengths of tubing spacedly mounted on said splicing strand to link the adjacent ends of said wire segments.

3. The combination according to claim 2 wherein each one of said coupling sleeves is crimped at the point where the linked segments meet to hold it in place.

4. In a reticulate wire belt having individual strands formed with alternate straight portions extending across the line of travel of the belt and bent portions extending between the straight portions whereby adjacent strands are interlocked, a composite strand of individual generally aligned wire segments interlocked with the respective end strands of the belt, and coupling elements linking the adjacent ends of said wire segments.

References Cited in the file of this patent

UNITED STATES PATENTS

| | | |
|---|---|---|
| 1,009,670 | Kihlgren | Nov. 21, 1911 |
| 1,040,790 | Sherman | Oct. 8, 1912 |